US006920473B2

United States Patent
Elbe et al.

(10) Patent No.: US 6,920,473 B2
(45) Date of Patent: Jul. 19, 2005

(54) METHOD AND APPARATUS FOR MODULAR MULTIPLYING AND CALCULATING UNIT FOR MODULAR MULTIPLYING

(75) Inventors: Astrid Elbe, München (DE); Norbert Janssen, München (DE); Holger Sedlak, Sauerlach (DE); Jean-Pierre Seifert, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/623,830

(22) Filed: Jul. 21, 2003

(65) Prior Publication Data

US 2004/0019622 A1 Jan. 29, 2004

Related U.S. Application Data

(63) Continuation of application No. PCT/EP02/00719, filed on Jan. 24, 2002.

(30) Foreign Application Priority Data

Feb. 16, 2001 (DE) .......................................... 101 07 376

(51) Int. Cl.⁷ .............................. G06F 7/00; G06F 7/38

(52) U.S. Cl. ...................................... 708/492; 708/446

(58) Field of Search ................................ 708/492, 446, 708/200, 491, 312, 490, 493

(56) References Cited

U.S. PATENT DOCUMENTS

| | | | | |
|---|---|---|---|---|
| 4,346,451 A | * | 8/1982 | Katayama | 708/491 |
| 4,625,076 A | * | 11/1986 | Okamoto et al. | 713/176 |
| 4,870,681 A | * | 9/1989 | Sedlak | 708/710 |
| 5,251,164 A | * | 10/1993 | Dodson et al. | 708/201 |

FOREIGN PATENT DOCUMENTS

| | | |
|---|---|---|
| DE | 36 31 992 A1 | 11/1987 |
| WO | 00/38047 | 6/2000 |

OTHER PUBLICATIONS

Guido, Should left shift test for overflow?, Jan. 20, 1992, http://www.python.org/search/hypermail/python-1992/0298.html, pp. 1-2.*

çetin K. Koç et al.: "Montgomery Multiplication in GF ($2^k$)", Designs, Codes and Crytography, vol. 14, No. 1, Apr. 1998, pp. 57-69.

Drescher, W. et al.: "VLSI Architectures for Multiplication in GF ($2^m$) for Application Tailored Digital Signal Processors", IEEE, 1996, pp. 55-64.

(Continued)

Primary Examiner—Kakali Chaki
Assistant Examiner—Chat C. Do
(74) Attorney, Agent, or Firm—Laurence A. Greenberg; Werner H. Stemer; Ralph E. Locher

(57) ABSTRACT

A multiplicand is multiplied by a multiplier using a modulus. The multiplicand, the multiplier and the modulus are polynomials of variable. A multiplication look-ahead method to obtain a multiplication shift value is carried out. An intermediate result polynomial is shifted to the left by the number of digits of the multiplication shift value. A reduction shift value equalling the difference of the degree of the shifted intermediate result polynomial and the degree of the modulus polynomial is obtained in a reduction look-ahead method. The modulus polynomial is then shifted by a number of digits equalling the reduction shift value. In a three-operands addition, the shifted polynomial and the multiplicand are summed and the shifted modulus polynomial is subtracted. The modular multiplication are iteratively executed and processed progressively until all the powers of the multiplier polynomial have been processed. With a carry disabling function Z/NZ arithmetic and GF arithmetic can be carried out on a single long number calculating unit.

13 Claims, 10 Drawing Sheets

OTHER PUBLICATIONS

Orton, G. A. et al.: "VLSI Implementation of Public–Key Encryption Algorithms", edited by G. Goos and J. Hartmanis, Lecture Notes in Computer Science, Advances in Cryptotology–CRYPTO '86, Springer–Verlag, pp. 277–301.

Alfred J. Menezes et al.: "Handbook of Applied Cryptography", *CRC Press, Boca Raton, pp. 600–603*.

Erkay Savas et al.: "A Scalable and Unified Multiplier Architecture for Finite Fields GF(P) and GF($2^m$)*", *in ç.K. Koç et al. (ed.): CHES 200, LNCS 1965, pp. 277–292, Springer–Verlag, Berlin, 2000*.

* cited by examiner

SC = 1 for normal addition
SC = 0 for XOR

METHOD AND APPARATUS FOR MODULAR MULTIPLYING AND CALCULATING UNIT FOR MODULAR MULTIPLYING

CROSS-REFERENCE TO RELATED APPLICATION

This application is a continuation of copending International Application No. PCT/EP02/00719, filed Jan. 24, 2002, which designated the United States and was not published in English.

BACKGROUND OF THE INVENTION

1. Field of the Invention

The present invention relates to methods and apparatuses for performing a modular multiplication and, for example, to the modular multiplication for elliptic curves over $GF(2^n)$.

2. Description of the Related Art

Cryptography is one of the essential applications for modular arithmetic. Depending on the form of the modulus N two cryptography methods are basically distinguished. If the modulus is an integer, we speak of a Z/NZ arithmetic. The parameter N stands for a prime number or for composed prime numbers. The parameter Z stands for integers. The RSA equation is an example of the case in which the modulus is composed of two prime numbers:

$$C = M^E \bmod(N).$$

As is known, C is an encrypted message, M is an un-encrypted or plain message, E is the public key and N is the modulus.

In contrast, the $GF(2^n)$ arithmetic is characterised in that the modulus $N(x)$ is a polynomial of a variable x. The polynomial includes a sum of individual powers of x, a coefficient being associated with each power of x. The exponent of the highest power of x is called the degree of the polynomial. If the coefficients are from the field of $GF(2)$, we speak of a $GF(2^n)$ modulus or, more generally, of a $GF(2^n)$ arithmetic, respectively. The $GF(2^n)$ arithmetic is, for example, used in the cryptography of elliptic curves.

A polynomial $f(x) \in GF(2)[x]$ of the degree $n-1$ is given by the n coefficients $a_{n-1}, \ldots, a_0$, wherein the $a_i$s must be from the set of $GF(2)$ and wherein $a_{n-1}$ per definition is 1:

$$f(x) = 1 \cdot x^{n-1} + a_{n-2} \cdot x^{n-2} + \ldots + a_1 \cdot x^1 + a_0 \cdot x^0$$

The field of $GF(2^n)$ is given by an irreducible polynomial of the degree n and by polynomials of $GF(2^n)$ of the degree smaller than or equal to $n-1$.

The addition, in $GF(2^n)$, of two elements, that is polynomials, is given by XORing their coefficient vectors with a length of n.

The multiplication, in $GF(2^n)$, of two elements, that is polynomials, is obtained by multiplying the polynomials over $GF(2^n)$ and subsequently reducing the obtained product modulo the irreducible polynomial $N(x)$ of the degree n, which defines the corresponding field.

Thus, the product polynomial, that is the polynomial which results from the multiplication of a first polynomial $f(x)$ by a second polynomial $g(x)$, must be subjected to a polynomial division with the modulus polynomial $N(x)$ as the divisor to perform the modular operation. The result of $f(x) \cdot g(x) \bmod N(x)$ is the remainder polynomial resulting from the polynomial division.

Before different manners for efficiently performing the modular multiplication over both Z/NZ and $GF(2^n)$ are dealt with, it should be noted that the modular exponentiation with both Z/NZ and $GF(2^n)$ can be split into a multiplication by means of the well-known Square and Multiply Algorithm. Thus, the following equation is to be solved:

$$C(x) = (M(x))^E \bmod N(x).$$

The Square and Multiply Algorithm is based on the fact that the exponent E is split into a sum of powers of two:

$$E = \sum_i E[i] * 2^i$$

The following example is to illustrate this. In binary representation, the following is to apply:

E=1011.

Thus, the following relation applies:

$$C(x) = M(x)^{(1*2^3 + 0*2^2 + 1*2^1 + 1*2^0)} \bmod N(x).$$

Thus, the following applies:

$$C(x) = (M(x))^8 * (M(x))^0 * (M(x))^2 * (M(x))^0 \bmod N(x).$$

For the Z/NZ arithmetic the equations described above are accordingly, with the difference that, instead of $M(x)$, M must be written and, instead of $N(x)$, N must be written.

In the art a well-known efficient and frequently used possibility to calculate the modular multiplications is known as the Montgomery multiplication and, for example, described in "Handbook of Applied Cryptography", Menezes, van Oorschot, Vanstone, CRC Press, pages 600 to 603. The Montgomery reduction is a technique allowing an efficient implementation of the modular multiplication without the classic modular reduction step being explicitly carried out. Generally in the Montgomery reduction the division operation is expressed by simple shift operations.

Meanwhile, an extension of the Montgomery multiplication operation to the finite field of $GF(2^n)$ is also known. This extension is described in "Montgomery multiplication in $GF(2^k)$", Koc, Azar, Designs, Codes and Cryptography, Vol. 14, 1998, pages 57 to 69. This extension is also described in "A Scalable and Unified Multiplier Architecture for Finite Fields Z/NZ and $GF(2^n)$", Erkay Savas, et al., Cryptographic Hardware and Embedded Systems (CHESS 2000), pages 281 to 289, Springer Lecture Notes.

It is a disadvantage of the Montgomery multiplication over Z/NZ or $GF(2^n)$ that, even if the division operation, which is difficult to implement in hardware, for a modular reduction is bypassed by shift operations, no look-ahead methods are used to accelerate the modular multiplication operation in hardware.

DE 3631992 C2 discloses a method in which the modular multiplication over Z/NZ can be accelerated using a multiplication look-ahead method and using a reduction look-ahead method. The method described in DE 3631992 C2 is also called ZDN method and described in detail referring to FIG. 9. After a starting step 900 of the algorithm, the global variables M, C and N are initialised. It is the objective to calculate the following modular multiplication:

$$Z = M * C \bmod N.$$

M is called the multiplier, C being called the multiplicand. Z is the result of the modular multiplication, N being the modulus.

Then, various local variables, which do not have to be dealt with now, are initialised. Two look-ahead methods are then applied. In the multiplication look-ahead method GEN_MULT_LA, a multiplication shift value $s_z$ as well as a multiplication look-ahead parameter a are calculated (910) using various look-ahead rules. The current contents of the Z register is then subjected (920) to a left-shift operation by $s_z$ digits.

Essentially parallel to this a reduction look-ahead method GEN_Mod_LA (930) is performed to calculate a reduction shift value $s_N$ and a reduction parameter b. In a step 940, the current contents of the modulus register, that is N, is shifted by $s_N$ digits to produce a shifted modulus value N'. The central three-operands operation of the ZDN method takes place in a step 950. After step 920 the intermediate result Z' is added to the multiplicand C which is multiplied by the multiplication look-ahead parameter a and to the shifted modulus N' which is multiplied by the reduction look-ahead parameter b. According to the current situation, the look-ahead parameters a and b may have a value of +1, 0 or −1.

One case is that the multiplication look-ahead parameter a is +1 and the reduction look-ahead parameter b is −1 so that the multiplicand C is added to a shifted intermediate result Z' and the shifted modulus N' is subtracted therefrom. Among others, a could have a value of 0 if the multiplication look-ahead method allowed more than one preset number of individual left shifts, that is, if $s_z$ were greater than the maximum allowed value of $s_z$ which is also called k. For the case that a equals 0 and that Z', due to the preceding modular reduction, that is the preceding subtraction of the shifted modulus, is still quite small, and especially smaller than the shifted modulus N', no reduction needs to take place so that the parameter b equals 0.

The steps 910 to 950 are performed until all the digits of the multiplicand have been processed, that is, until m equals 0 and until a parameter n also equals 0, which indicates whether the shifted modulus N' is still greater than the original modulus N and whether, despite the fact that all the digits of the multiplicand have already been processed, further reduction steps must be performed by subtracting the modulus from Z.

Finally, it is determined whether Z is smaller than 0. If this is the case, the modulus N must be added to Z to obtain a final reduction so that in the end a positive result Z of the modular multiplication is obtained. In a step 960, the modular multiplication is finished by means of the ZDN method.

The multiplication shift value $s_z$ as well as the multiplication parameter a, which are calculated in step 910 by the multiplication look-ahead algorithm, arise from the topology of the multiplier as well as from the inserted look-ahead rules described in DE 3631992 C2.

The reduction shift value $s_N$ and the reduction parameter b are determined by comparing the current contents of the Z register with a value of ⅔ times N, as is also described in DE 3631992 C2. It is due to this comparison that the ZDN method has its name (ZDN=Zwei Drittel N=Two Thirds N).

As is illustrated in FIG. 9, the ZDN method reduces the modular multiplication to a three-operands addition (Block 950 in FIG. 9), the multiplication look-ahead method and, therefore, the reduction look-ahead method being utilized to increase the computing time efficiency. Compared to the Montgomery reduction for Z/NZ, a computing time advantage by a factor in the order of magnitude of 3 can thus be obtained.

As has already been explained, the ZDN method described in DE 3631992 C2 only works for the Z/NZ arithmetic. It is, however, not suitable for the $GF(2^n)$ arithmetic. Thus, at present, there is no method in which computing time efficient look-ahead methods can be utilized for the $GF(2^n)$ arithmetic to accelerate the modular multiplication over $GF(2^n)$.

SUMMARY OF THE INVENTION

It is the object of the present invention to provide a concept for quickly performing a modular multiplication over $GF(2^n)$.

In accordance with a first aspect of the invention, this object is achieved by a method for modular multiplying a multiplicand by a multiplier using a modulus, said multiplicand, said multiplier and said modulus being polynomials of a variable, with a cryptographic calculation, said multiplicand, said multiplier and said modulus being parameters in said cryptographic calculation, said method comprising the following steps:

(a) performing a multiplication look-ahead method to obtain a multiplication shift value, said multiplication shift value being incremented at a power of said multiplier, which is not present in the multiplier polynomial;

(b) multiplying said variable raised to the power of said multiplication shift value by an intermediate result polynomial to obtain a shifted intermediate result polynomial;

(c) performing a reduction look-ahead method to obtain a reduction shift value, said reduction shift value being equal to the difference of the degree of said shifted intermediate result polynomial and the degree of said modulus polynomial;

(d) multiplying said variable raised to the power of said reduction shift value by said modulus polynomial to obtain a shifted modulus polynomial;

(e) summing said shifted intermediate result polynomial and said multiplicand and subtracting said shifted modulus polynomial to obtain an updated intermediate result polynomial; and (f) repeating steps (a) to (e) until all the powers of said multiplier have been processed, wherein in the repetition of steps (a) to (e)

in step (d) said updated intermediate result polynomial of the previous step (e) is used as said intermediate result polynomial, and in step (c) said shifted polynomial of the previous step (d) is used as a modulus polynomial.

In accordance with a second aspect of the invention, this object is achieved by an apparatus for modular multiplying a multiplicand by a multiplier using a modulus, said multiplicand, said multiplier and said modulus being polynomials of a variable, within a cryptographic calculation, said multiplicand, said multiplier and said modulus being parameters in said cryptographic calculation, said apparatus comprising:

(a) means for performing a multiplication look-ahead method to obtain a multiplication shift value, said multiplication shift value being incremented at a power of said multiplier, which is not present in the multiplier polynomial;

(b) means for multiplying said variable which is raised to the power of said multiplication shift value by an intermediate result polynomial to obtain a shifted intermediate result polynomial;

(c) means for performing a reduction look-ahead method to obtain a reduction shift value, said reduction shift value being equal to the difference of the degree of said shifted intermediate result polynomial and the degree of said modulus polynomial;

(d) means for multiplying said variable which is raised to the power of said reduction shift value by said modulus polynomial to obtain a shifted modulus polynomial;

(e) means for summing said shifted intermediate result polynomial and said multiplicand and subtracting said shifted modulus polynomial to obtain an updated intermediate result polynomial; and (f) means for repeatedly controlling said means (a) to (e) until all the powers of said multiplier have been processed, wherein in a repeated control of said means (a) to (e) said means for multiplying to obtain a shifted intermediate result polynomial is arranged to use said updated intermediate result polynomial of the previous control of said means for summing as an intermediate result polynomial, and said means for performing a reduction look-ahead method is arranged to use, in a repeated control, as the modulus polynomial, said shifted modulus polynomial of the previous control of said means for multiplying to obtain a shifted modulus polynomial.

The present invention is based on the understanding that an acceleration of the modular multiplication over $GF(2^n)$ can be obtained by utilizing both a multiplication look-ahead method and a reduction look-ahead method. In the multiplication look-ahead method, a multiplication shift value is calculated. In the reduction look-ahead method, which preferably runs in parallel to the multiplication look-ahead method, a reduction shift value is calculated, the reduction shift value equalling the difference of the degree of an intermediate result polynomial shifted by the multiplication shift value and the degree of the current modulus polynomial. While the intermediate result polynomial is multiplied by the variable which is raised to the power of the multiplication shift value, the modulus polynomial is multiplied by the variable which is raised to the power of the reduction shift value. Thus, a three-operands addition may also be formulated for the $GF(2^n)$ arithmetic so that a new intermediate result polynomial can be calculated by summing the last intermediate result polynomial shifted by the multiplication shift value and the multiplicand and by then subtracting therefrom the modulus polynomial shifted by the reduction shift value in order to obtain an updated intermediate result polynomial. All the steps are then repeated, however, using the updated intermediate result polynomial and the modulus polynomial shifted in the last step to successively sum all the partial products, that is, until all the powers of the multiplier have been processed.

The three-operands addition is especially simplified for the case of the $GF(2^n)$ arithmetic in that the coefficients of the powers of the variable x either have the value "0" or "1". Thus, both the addition and the subtraction become a simple XORing so that for a calculating unit which is solely adapted for the $GF(2^n)$ addition as an arithmetic unit not even an adder is required but solely a bitwise XORing of the three operands.

In the case of a dual calculating unit, that is, a calculating unit which is to carry out a modular multiplication in both Z/NZ and in $GF(2^n)$, the three-operands adder already present for the ZDN method can simply be modified for $GF(2^n)$ operations by disabling, that is not taking into account, the carry for each bit of the adder.

It should be noted that the inventive method for calculating the modular multiplication in $GF(2^n)$ has a serial-parallel architecture. The three-operands addition preferably always takes place in parallel, that is for all the bits of the addends which typically comprise a width of 150 to 1100 bits, a new partial product being calculated in a next serial iteration of the inventive method and in a subsequent parallel three-operands addition being added to the intermediate result already existing.

The inventive concept for calculating a modular multiplication is advantageous in that it provides a maximum acceleration by a factor in the order of magnitude of two compared with the Montgomery multiplication for $GF(2^n)$ as well.

A further advantage of the inventive concept is that now an efficient method for calculating the modular multiplication in $GF(2^n)$ is given so that, for example, the ECDSA algorithm (ECDSA=Elliptic Curve Digital Signature Algorithm) over $GF(2^n)$ can be calculated. This algorithm is described in "Public Key Cryptography for the Financial Services Industry: The Elliptic Curve D.S.A.", ANSI X9.62-1998.

It is pointed out that the elliptic curve cryptography is preferred compared to a cryptography based on a modular arithmetic regarding an integer in that similar standards of security can be obtained with considerably smaller numbers. While for the RSA method over Z/NZ with numbers having a width of 1024 bits good standards of security are obtained, polynomials over GF(2), the degree of which is in the range of 150 to 300 powers of the variable x, suffice for this.

A further advantage of the present invention is that the inventive concept for calculating the modular multiplication can easily be integrated into already existing calculating units for the ZDN method since the actual long-number calculating unit, that is the three-operands adder, can simply be adapted for $GF(2^n)$ by disabling the bitwise carry. Even if the arithmetic units for the reduction look-ahead algorithm and for the multiplication look-ahead algorithm for $GF(2^n)$ are different from the corresponding apparatuses for Z/NZ, this is not decisive for the overall performance of the calculating unit since in this case additions, shifts or subtractions with small numbers occur, which may have a width of 8 or 16 bits so that the chip area for these arithmetic units which are also called control units, compared to the long number calculating unit, that is the three-operands adder, which can very well have a width of over 2048 bits (in dual implementation for Z/NZ and $GF(2^n)$), does not provide a major contribution.

A further advantage of the inventive concept for a modular multiplication in $GF(2^n)$ is that, compared to the ZDN method which only works for the Z/NZ arithmetic, many operations can be simplified. Thus, in the inventive $GF(2^n)$ modulo multiplication no comparison with the ⅔ times the modulus must be performed. This comparison, in $GF(2^n)$, can simply be substituted by the comparison of the degree of the intermediate result polynomial and the degree of the modulus polynomial. Since the expected value for the multiplication shift value and the expected value for the reduction shift value are identical, the two look-ahead methods are decoupled of each other so that there is the potential that the two look-ahead methods work independently of each other which in turn brings computing time advantages about.

BRIEF DESCRIPTION OF THE DRAWINGS

In the following preferred embodiments of the present invention are described in detail referring to the enclosed drawings in which.

DETAILED DESCRIPTION OF PREFERRED EMBODIMENTS

Figure 1:
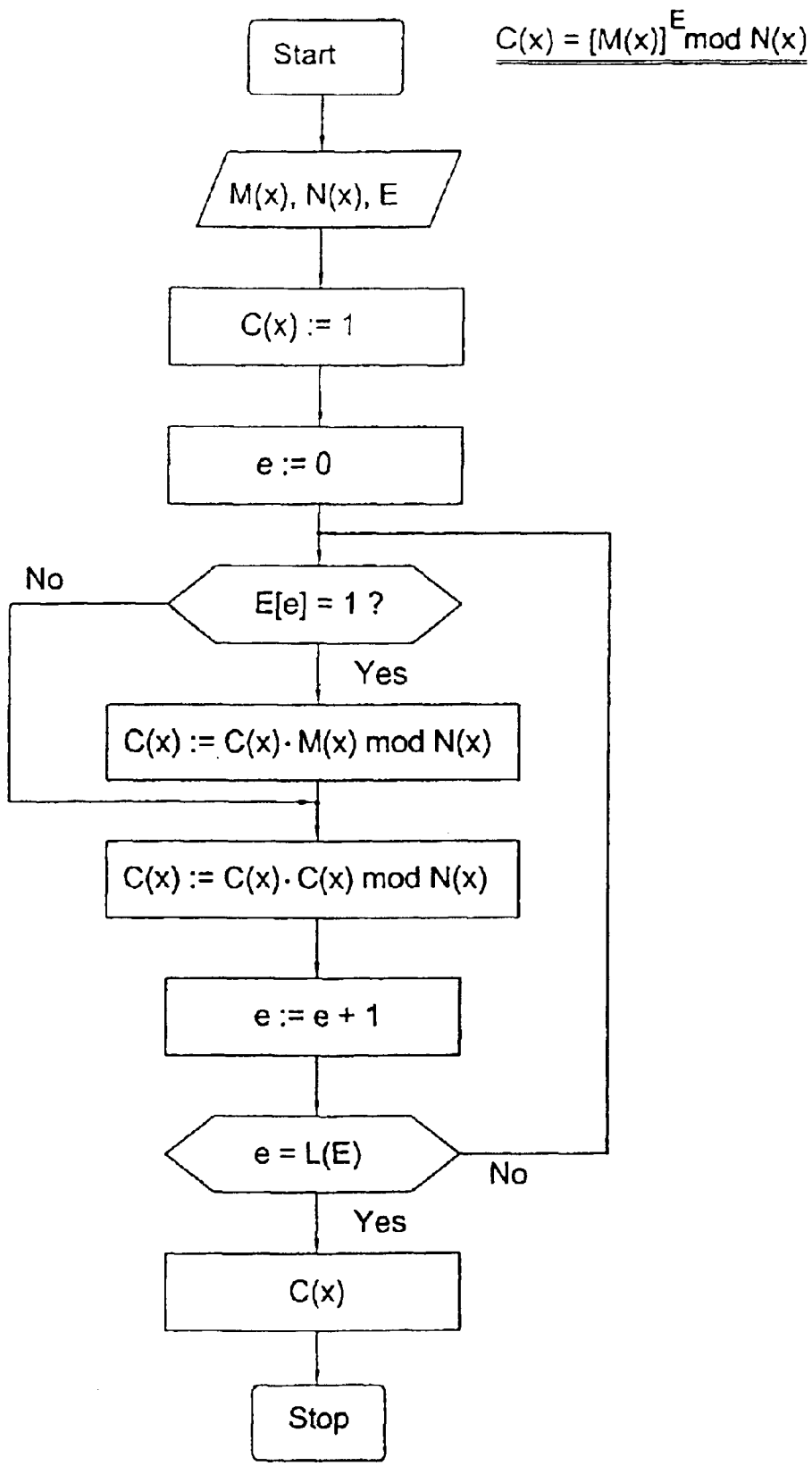
FIG. 1 is a flow chart for illustrating the modular exponentiation in $GF(2^n)$.

FIG. 1 is a general flow chart for splitting a modular exponentiation $$C(x)=(M(x))^E \bmod N(x)$$

into a series of multiplications. M(x) and N(x) are polynomials of the variable x. E is an exponent in binary representation having a bit length L(E).

The algorithm basically consists of examining whether a bit of the exponent E, that is E(e), equals 1. If this is the case, the current contents of the result register is multiplied by M(x), the modulo reduction with the modulus polynomial N(x) being performed immediately after that. If, however, a bit of the exponent equals 0, no multiplication by M(x) is performed. In both cases the current contents of the register C(x) is multiplied by itself, that is, squared, the modulo reduction then taking place. The index for the digit of the exponent, that is e, is then incremented by 1, the loop then being passed through again. This is performed until all the digits of the exponent E have been processed, that is, until e equals L(E). The algorithm is then finished and in the register for C(x) there is the result of the modular exponentiation. The central operation of the modular exponentiation is thus the modular multiplication of a multiplicand C(x) by a multiplier M(x).

Figure 2:
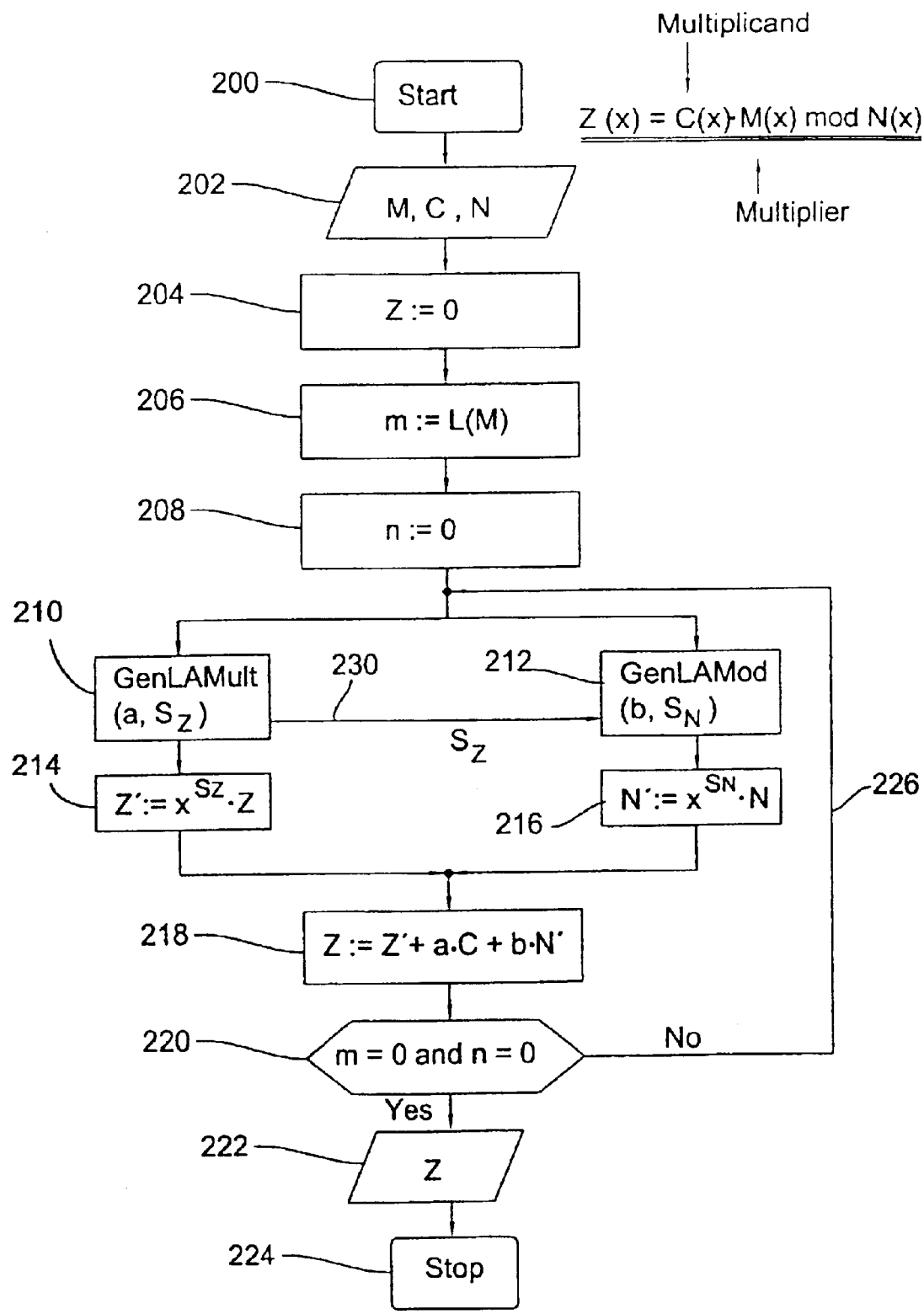
FIG. 2 is a high-level flow chart of the inventive method.

FIG. 2 shows a high-level block diagram of the inventive method for modular multiplying a multiplicand by a multiplier. The method starts at a start block 200. In a block 202, the global variables M, C and N, which are polynomials of the variable x, are initialised. In a block 204, the intermediate result polynomial Z is then initialised to 0. In a block 206, the control variable m is initialised to L(M). L(M) indicates the length of the multiplier M in bits. L(M) thus corresponds to the degree of the multiplier polynomial. In a block 208, a control variable n is initialised to 0. The function of the control variable n will be explained later. Subsequently, a multiplication look-ahead method 210 and a reduction look-ahead method 212 are preferably performed in parallel. The multiplication look-ahead method serves to calculate a multiplication shift value $s_z$ and preferably a multiplication look-ahead parameter a as well.

The reduction look-ahead method serves to calculate a reduction shift-value $s_N$ and preferably a reduction look-ahead parameter b as well.

In a block 214, a shifted intermediate result polynomial Z' is calculated by multiplying the current intermediate result polynomial Z by the variable x which is raised to the power of the multiplication shift value $s_Z$.

In a block 216, a shifted modulus polynomial N' is preferably calculated in parallel by multiplying the current modulus polynomial N by the variable x which is raised to the power of the reduction shift value $s_N$.

In a block 218, the so-called three-operands addition which is the central operation of the inventive multiplication method is carried out. In block 218, an updated intermediate result polynomial Z is calculated, which is obtained by the addition of the intermediate result polynomial Z' and the multiplicand C multiplied by the multiplication look-ahead parameter a and of the shifted modulus polynomial N' multiplied by the reduction look-ahead parameter b.

In a block 220, it is examined whether the control variable m equals 0 and whether the control variable n equals 0 at the same time. If the control variable m equals 0, this means that all the bits of the multiplier M(x) have been processed. If the control variable n equals 0, this means that the shifted modulus polynomial N' corresponds to the original polynomial N of block 202 again.

If these two conditions are met, block 220 will thus be answered with a YES so that the result of the modular-multiplication, that is Z(x), can be output in a block 222. The method for modular multiplying is then finished in a block 224.

If block 220, however, is answered with a "NO", this either means that there are still bits of the multiplier which have not been processed or that the modulus polynomial N' which is held in the register for the modulus polynomial is still greater than the original modulus polynomial defined in block 202. Expressed differently, this means that the degree of the current polynomial held in the register for the modulus polynomial is greater than the degree of the original modulus polynomial N which has been defined in block 202. If this is the case, a return will be performed as is shown by a feedback 226 in FIG. 2 to carry out both the multiplication look-ahead method and the reduction look-ahead method again. In contrast to the first step in which the Z register, due to the initialisation in block 204, has been set to 0, it is now the result of the three-operands operation 218 of the previous step, which is in the Z register.

In the same way, it is no longer the original modulus N defined in block 202, which is in the modulus register N, but the modulus polynomial N' which has been shifted by the reduction shift value $s_N$. The original modulus N(x) which has been defined in block 202 will thus only be in the N register during the first iteration step, while during iteration (iteration loop 226) it is always the shifted modulus polynomial which is in the modulus register, that is a modulus polynomial which has been multiplied by the variable x which is raised to the power of a reduction shift value $s_N$.

Figure 3:
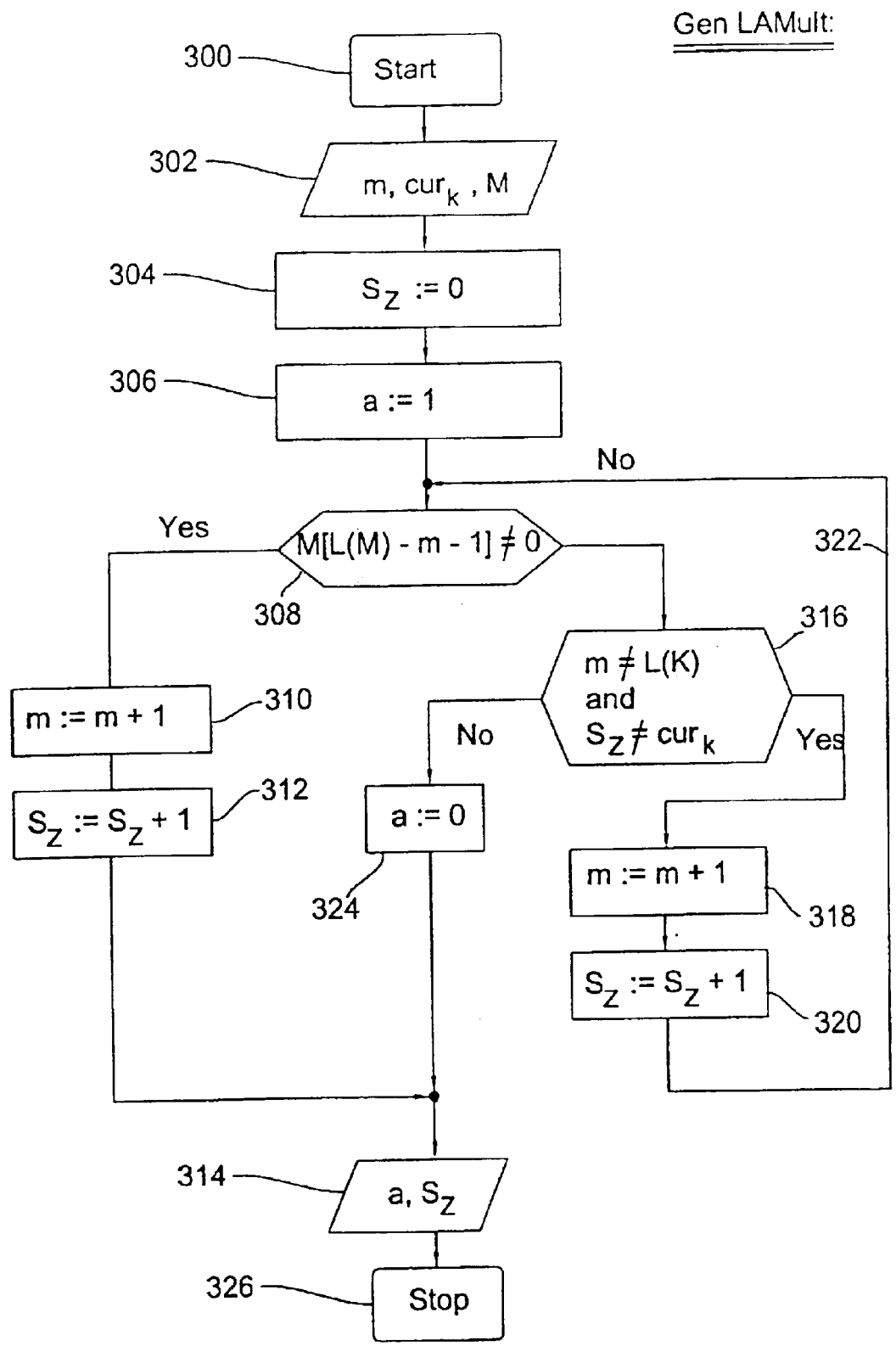
FIG. 3 is a flow chart of the multiplication look-ahead method for calculating the multiplication shift value.

Reference will now be made to FIG. 3 which illustrates a more detailed illustration of the multiplication look-ahead method, that is of block 210 in FIG. 2. The multiplication look-ahead method starts at a block 300. It receives, as global variables, the parameter m of FIG. 2, a further control variable $cur_k$, which will be explained later, as well as the multiplier M. This is illustrated by a block 302 in FIG. 3. In a block 304, the multiplication shift value $s_z$ is initialised to 0. Furthermore, the multiplication look-ahead parameter a, which will be explained later, is initialised to a value of 1 (block 306).

It is then examined in a block 308 whether the actual bit or the coefficient of the currently processed power of x, respectively, equals 0 or not. If it is determined in block 308 that the currently processed bit of the multiplier is unequal to 0, that is if the determination of block 308 is answered with a YES, the control variable m will be incremented by 1 in a block 310. Furthermore, the multiplication shift value $s_z$ is also incremented by 1 in a block 312. In a block 314, the resulting parameters of the multiplication look-ahead method, that is the multiplication look-ahead parameter a and the multiplication shift value $s_z$, are output.

If the question in block 308 is answered with a NO, a jump to a further determination block 316 will be performed. It is determined here whether the control variable m is still smaller than the length, that is the degree, of the multiplier M. In addition, it is examined whether the current multiplication shift value $s_z$ is smaller than or unequal to the parameter $cur_k$, respectively. If both questions are answered with a YES, a jump to a block 318 will be performed to increment the parameter m by 1. Furthermore, in a block 320, the multiplication shift value $s_z$ is also incremented by 1. Subsequently, the next bit of the multiplier M is examined, which is illustrated in FIG. 3 by a feedback branch 322.

If it is, however, determined in block 316 that one of the two questions in block 316 is answered with a NO, a jump to a block 324 will be performed, in which the multiplication look-ahead parameter a is set to 0. It can thus be seen that the multiplication look-ahead parameter a which is output in block 314 can either be 0 or 1. The multiplication look-ahead method is then finished in a block 326.

In the following, the mode of operation of the multiplication look-ahead parameter will be explained. The multiplication look-ahead method, which is utilized according to the invention, is a look-ahead algorithm for the GF($2^n$) multiplication with variable shifts over zeros, wherein the number of the variable shifts cannot become arbitrarily great, but, at most, be equal to a value $CUR_k$. "$CUR_k$" means "current k", that is "current value of the parameter k".

In the following, a multiplier polynomial with the coefficient "10001" will be exemplary examined. First, the most significant bit thereof is examined. This bit has the value "1" so that block 308 is answered with a YES, which leads to the parameter m being incremented by 1 and to the multiplication shift value $s_z$ being increased by 1 as well. The multiplication look-ahead algorithm is thus already finished since the examined bit of the multiplier had the value "1", in such a way that in the three-operands addition the multiplicand C must be added.

In a next passage of the multiplication look-ahead algorithm the second bit is examined. This bit has a value of 0 so that block 308 is answered with a NO. If the examined bit is just the second bit of the multiplicand and if the multiplication shift value $s_z$, due to the initialisation in block 304, is 0, block 316 will be answered with a YES so that the control variable m is incremented by 1 (318) and the multiplication shift value is also incremented by 1 (320). Block 308 is then entered again via the branch 322. Since the next bit also has a value of "0", this block is repeatedly answered with a NO and block 316 is again the current one. m is still smaller than L(M) so that this question is answered positively. $s_z$ just has the value 1. When it is supposed that $CUR_k$ has a value of 2, this question is also answered positively so that in blocks 318 and 320 increments of m and $s_z$ take place again. After the passage of block 320, $s_z$ has the value of 2. A jump via the branch 320 to block 308 is again performed to determine whether the current next bit is a 1 or a 0. For the present example, block 308 is again answered with a NO since in this case the third bit in a sequence of zeros is examined. Block 316, however, is now answered with a NO since $s_z$ is 2 and the variable $CUR_k$ is also 2. This means that the multiplication look-ahead method is thus, so to speak, cancelled even if the third 0 could also be used to effect a new shift. $s_z$, however, must be limited to the top since otherwise an infinitely long Z register would have to be provided to be able to store the shifted intermediate result polynomial Z', which is calculated in step 214 of FIG. 2. $CUR_k$ is thus set depending on the current movement of the Z register to allow the greatest possible shift value $s_z$, which contributes to a gain in velocity, on the one hand but to manage with a limited register length for the shifted intermediate result polynomial Z' at the same time. The three-operands operation in block 218 of FIG. 2 thus degenerates into a two-operands operation since the parameter a in block 324 of FIG. 3 has been set to 0.

As can be seen from FIG. 3, in the branch of block 324 no further increments of m took place so that in a renewed passage of the multiplication look-ahead algorithm it is now the third 0 bit in the sequence that is examined in block 308. Since this bit has a value of 0, block 308 is again answered with a NO so that the multiplication shift value $s_z$ is incremented by 1 and that the control variable in block 318 is also incremented. The last bit of the multiplier, that is the "1", is now examined. Since this bit is unequal to 0, block 308 is answered with a YES, the control variable is incremented for a last time and the multiplication shift value $s_z$ is also incremented again until the multiplication look-ahead algorithm for this iteration is finished (block 326). All the bits of the multiplicand have now been examined so that the iteration loop 226 of FIG. 2 is finished since it is examined in block 220 whether m equals 0, which now applies for the present example.

In the following, reference is made to FIG. 4 to describe the reduction look-ahead method which, in FIG. 2, is designated with the reference numeral 212. In a block 400, the reduction look-ahead method starts. In a block 402, various global variables of which especially N and Z are to be emphasised are defined. N is the register value for the modulus polynomial of the preceding step, while Z is the updated intermediate result polynomial of the preceding step as well. k is the maximum shift value for Z, $CUR_k$ is the current shift value for Z and MAX is the length, that is the number of bits, of an overflow buffer which serves to store the left-shifted polynomials N and Z. When block 216 of FIG. 2 is considered, it can be seen that, if an arbitrarily great reduction shift value $s_N$ were provided, an arbitrarily great register for N would have to be provided like in the analogue case of the multiplication look-ahead method. This, however, is not desirable for reasons of space and efficiency so that by means of the parameter MAX it is also taken into account that the modulus polynomial, too, can only be shifted by a certain number of bits to the left, that is to the top.

In a block 404, a parameter $s_i$ which will be described later is initialised to 0. It is then determined in a block 406 whether the parameter n which indicates the number of bits of N which are in the overflow buffer equals 0, or whether $s_i$ equals k. If block 406 is answered with a YES, a jump to a block 408 will be performed, in which the reduction look-ahead parameter b is set to 0. If, however, the question in block 406 is answered with a NO, the parameter n is incremented by 1 (block 410). At the same time, the parameter $s_i$ is incremented by 1, as is illustrated by a block 412. Subsequently, the central comparison takes place in block 414, by means of which it is to be determined by how much the modulus polynomial is to be shifted so that in the three-operands operation (block 218 of FIG. 2) a modular reduction of the intermediate result polynomial takes place. For this, the auxiliary reduction shift value $s_i$ is determined so that the degree of the polynomial which arises from the multiplication of x, x being raised to the power of $s_i$, multiplied by the updated intermediate result polynomial of the preceding step, is equal to the degree of the current modulus polynomial. This is carried out step by step as is indicated by an iteration loop 416 until either a YES-result is obtained in block 406 or a YES-result is obtained in block 414. If block 414 is answered with a YES, the reduction look-ahead parameter b will be set to 1 in a block 418. In a block 420, a new parameter n is then calculated from the difference of the multiplication shift value $s_z$ and the current value n. The real reduction shift value $s_N$ is then calculated in a block 422 by forming the difference of the multiplication shift value $s_z$ and the auxiliary reduction shift value $s_i$.

It is pointed out that the multiplication shift value $s_Z$ is provided by the actually parallel passing multiplication look-ahead algorithm as is indicated by an arrow 230 in FIG. 2. Without the introduction of an auxiliary reduction parameter $s_i$, only a serial implementation of the multiplication look-ahead method and, after this, of the reduction look-ahead method would be feasible, which for reasons of efficiency is not desirable. Therefore, the auxiliary reduction parameter $s_i$ is used, by means of which the actual calculation of the reduction shift value $s_N$ can be prepared that far that the extensive iteration loop (branch 416 in FIG. 4) can actually be processed in parallel to the multiplication look-ahead algorithm, while the actual calculation of the reduction shift value $s_N$ can be performed by a fast formation of the difference of two short numbers $s_z$ and $s_i$. Thus the sequence is the following. $s_Z$ and $s_i$ are calculated in parallel. $s_Z$ is then delivered from the multiplication look-ahead algorithm via the branch 230 of FIG. 2, which can also be seen in FIG. 4, to the reduction look-ahead algorithm so that the reduction shift value $s_N$ is already directly available in the next cycle. This will be explained later referring to FIGS. 8a to 8c.

After block 422, it is determined in a block 424 whether n is greater than MAX minus k. If this question is answered with a YES, a new $cur_k$ will be calculated in a block 426. If the question in block 424 is answered with a NO, $cur_k$ will be equated with k in a block 428. In a block 430, the result values of the reduction look-ahead method, that is b and $s_N$, are output so that the reduction look-ahead method is finished in a block 432.

Referring to a detailed explanation of the multiplication look-ahead parameter a and the reduction look-ahead parameter b as well as the storage management parameters n, MAX, k and $cur_k$, reference is made to DE 3631992 C2. Unlike the ZDN method for Z/NZ, in which the parameters a and b can take values of +1, 0 and −1, the corresponding parameters a, b in the inventive method can only take the values of 0 and 1. The look-ahead parameters a and b are solely optionally required for the modular multiplication according to the present invention, namely in the case that there are not arbitrarily great storage locations available for N and Z. Generally, the inventive method can, however, be easily carried out under the condition that arbitrarily great registers are available, in which case the multiplication look-ahead method will never be cancelled but always performed until a "1" is found in the multiplier. Until then, referring to block 214 of FIG. 2, $s_Z$ has a certain possibly great value so that the shifted intermediate result polynomial Z' can possibly take an extensively great value. Due to the fact that a 1 has been found in the multiplier, the multiplicand is then added to the shifted intermediate result polynomial Z' in block 218.

It is, however, an essential feature that concurrently with each multiplication step a modular reduction also takes place so that the numerical values as a whole can be kept to a tolerable level.

For this, the reduction shift value $s_N$ according to the present invention is selected in such a way that the degree of the shifted modulus polynomial is equal to the degree of the current intermediate result polynomial. If then the shifted modulus polynomial is subtracted from the sum of Z'(x) and C(x), the updated intermediate result Z will typically always be smaller than Z' so that a reduction has been obtained. Thus, it can be seen that the updated intermediate result polynomial Z, which is calculated by step 218 in FIG. 2, is not necessarily reduced regarding the original modulus polynomial of block 202, but is maybe reduced during the whole iteration only regarding a left-shifted modulus polynomial, that is a modulus polynomial with a higher degree. However, this need not be like this. If this case is, however, to arise, it will be achieved by step 220 in which it is determined whether n equals 0, that is whether N has bits in the overflow buffer or not, that further subtractions of the modulus from the updated intermediate result take place so that Z can then progressively be reduced into the original remainder class. If n equals 0, this means that there are no more bits of N in the overflow buffer, which in turn means that the finally obtained shifted modulus polynomial equals the original modulus polynomial of block 202.

Thus, it can be seen that the inventive method for modular multiplying basically can also be carried out without look-ahead parameters a and b, in which case, however, theoretically unlimited registers for Z and N would be required—if arbitrary multipliers were assumed.

If a storage limit is provided for Z and N, that is if the look-ahead parameter a and b may be 0, a multiplication look-ahead parameter a equal to 0 means that no multiplicand is added to the shifted Z'. Analogue to this, a reduction look-ahead parameter b equal to 0 means that the shifted modulus polynomial is greater than the shifted intermediate result polynomial Z', for which reason no reduction is required so that the modulus subtraction can be omitted as well. In such a case the three-operands operation would degenerate completely.

At this stage it is also pointed out that in the case of a limited buffer for the registers Z and N it must be watched that N is kept from its Home MSB by at least k bits as long as the variable m has not reached the value 0.

It is further pointed out that in the case of a $GF(2^n)$ arithmetic, that is if the coefficients of the polynomial can only be 0 or 1, the addition operation corresponds to the subtraction operation and can generally be carried out as an XORing. If, however, coefficients of the polynomial were allowed in a different number system, for example, in an octal numbering system or a decimal numbering system, the subtraction would, of course, not correspond to the addition.

Figure 8A:
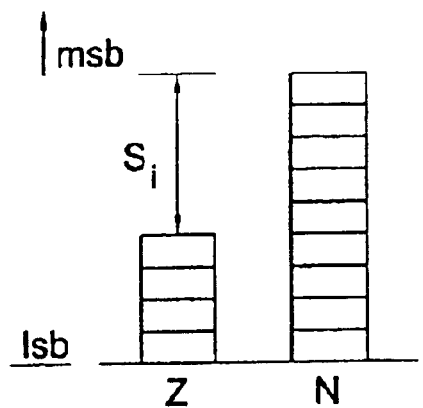
FIGS. 8a to 8c are schematic illustrations for illustrating the calculation of the reduction shift value.

In the following, reference is made to FIGS. 8a to 8c to illustrate the calculation of the reduction shift value $s_z$ using the auxiliary reduction shift value $s_i$. In FIG. 8a, an intermediate result polynomial Z and a modulus polynomial N are illustrated. Only as an example, the intermediate result polynomial has a degree of 4, that is, 4 bits, while the modulus polynomial has a degree of 9, that is, 9 bits. It is further assumed that in block 214 of FIG. 2 a shifted intermediate result polynomial Z' is calculated, which can be obtained by multiplying the variable x which is raised to the power of $s_Z$. It is assumed that there were 8 zeros in the multiplier, which leads to the fact that the multiplication shift value $s_z$ has been 8. To obtain a modular reduction, the modulus N must reach the order of magnitude of the shifted intermediate result polynomial Z'. According to the invention, the modulus polynomial N is to be shifted that far that the degree of the shifted intermediate result polynomial Z' and the degree of the shifted modulus polynomial N are equal. As can be seen from FIG. 8b, a reduction shift value $s_N$ equal to 3 is required for this.

Figure 8B:
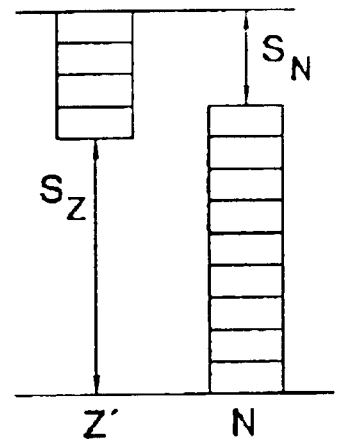

It can also be seen from FIG. 8b that finding out $s_N$ can really only be performed when $s_z$ has been calculated, which means that a parallel execution of blocks 210 and 212 of FIG. 2, as is preferred for the present invention, is not possible. For this reason, the auxiliary shift parameter $s_i$ is introduced. As can be seen from FIG. 8a, the auxiliary shift parameter $s_i$ equals the difference of the degree of the intermediate result polynomial Z and the modulus polynomial N. It is an advantage of $s_i$ that this value can be calculated without $s_z$ knowing the current step.

Figure 8C:
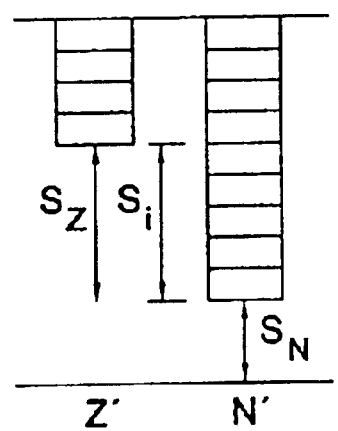
Figure 9:
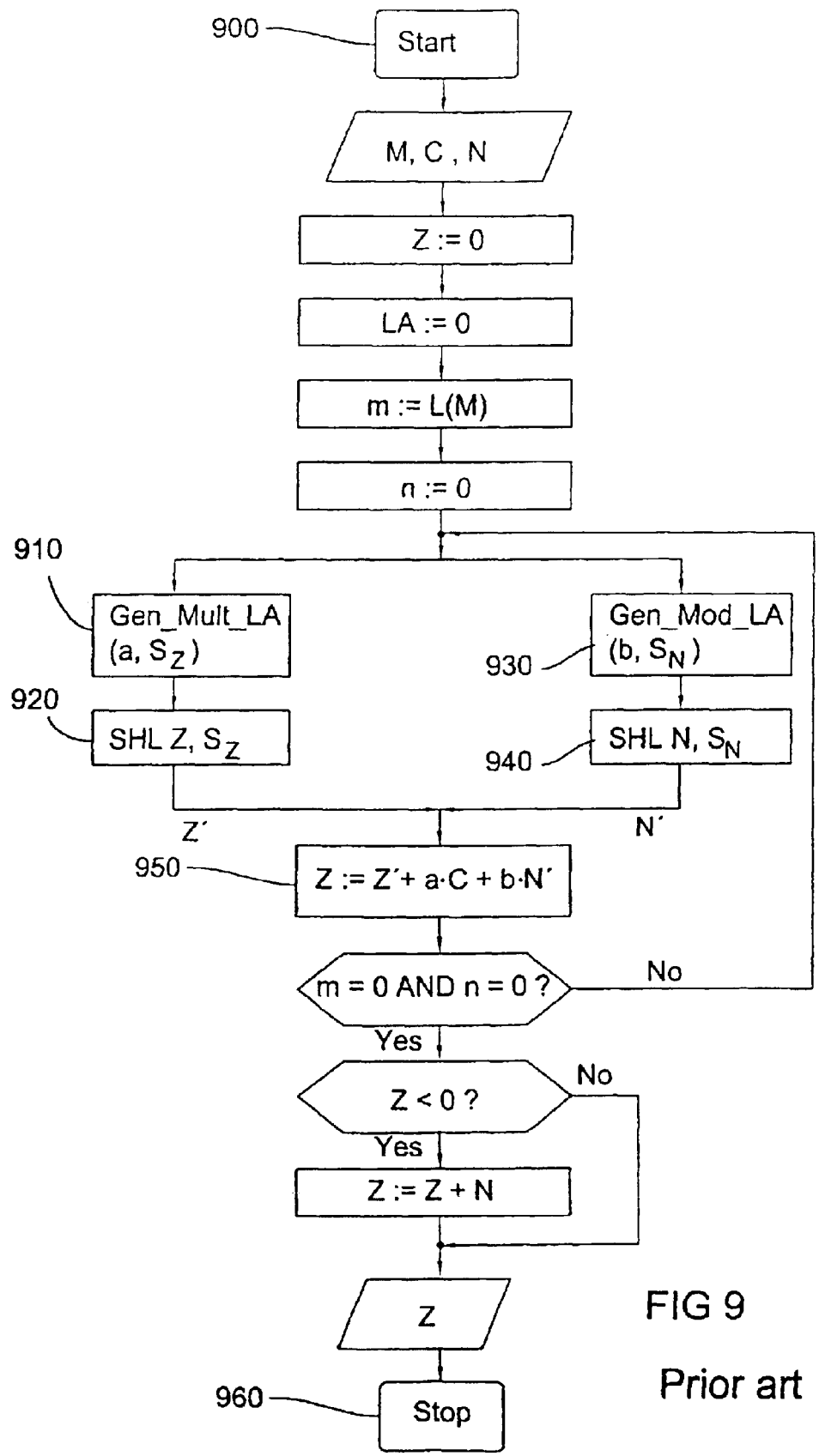
FIG. 9 is a general diagram of the ZDN method for performing a modular multiplication in Z/NZ.

It can be seen from FIG. 8c that $s_z$ always equals the sum of $s_i$ and $s_N$. $s_N$ is thus always dependent on $s_z$ and $s_i$ in such a way that the following equation applies:

$$s_N = s_Z - s_i.$$

Figure 4:
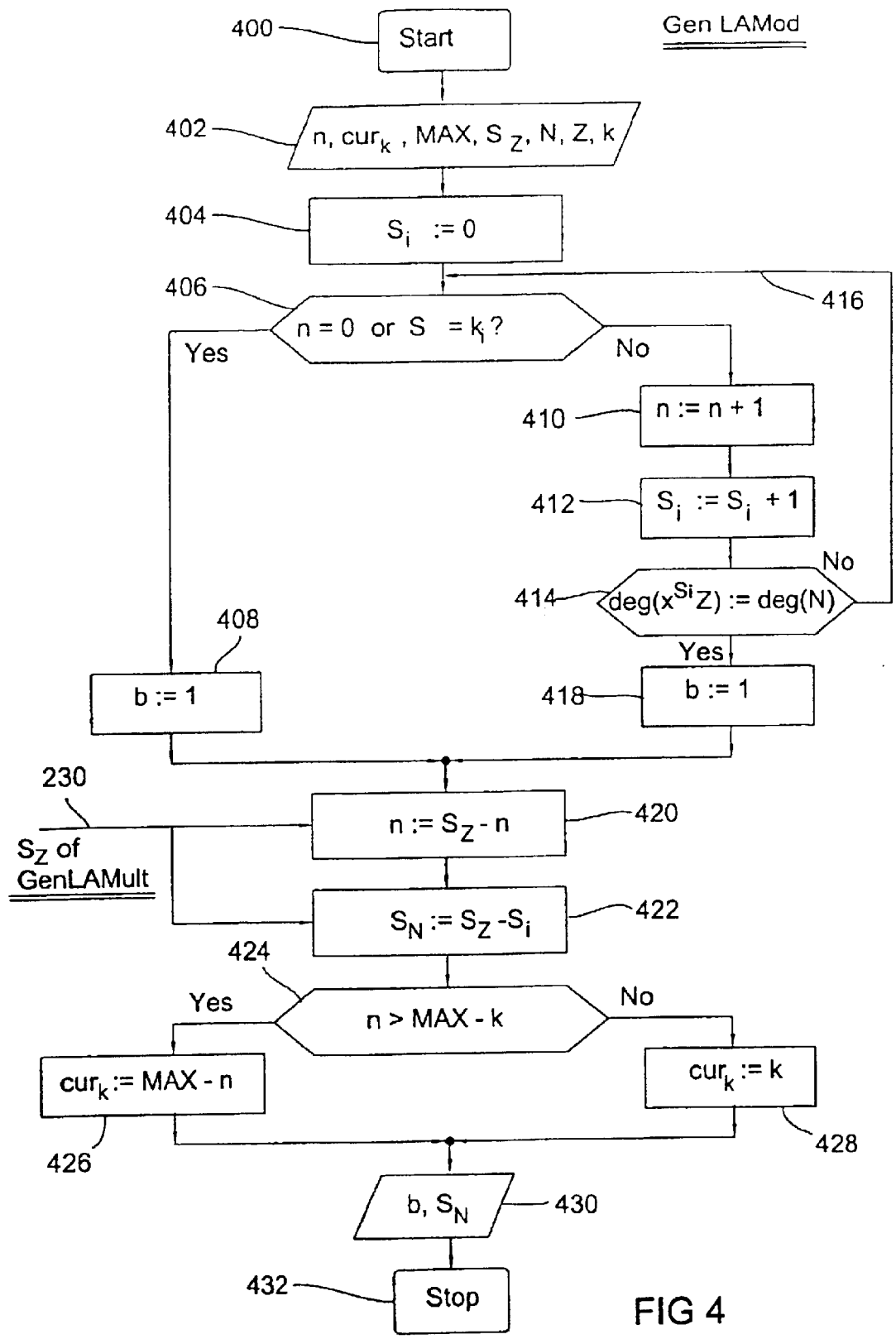
FIG. 4 is a flow chart of the reduction look-ahead method for calculating the reduction shift value.

The time-consuming iterative method for determining $s_N$ can thus be split into a time-consuming iterative method for determining $s_i$ (loop 416) and a fast difference operation (block 422 in FIG. 4). Thus, a nearly parallel execution of both look-ahead methods is possible, the only serial component being that before calculating block 422 (FIG. 4), the actual value of $s_Z$ has been calculated and provided by the multiplication look-ahead algorithm (arrow 230 in FIG. 2).

Figure 5:
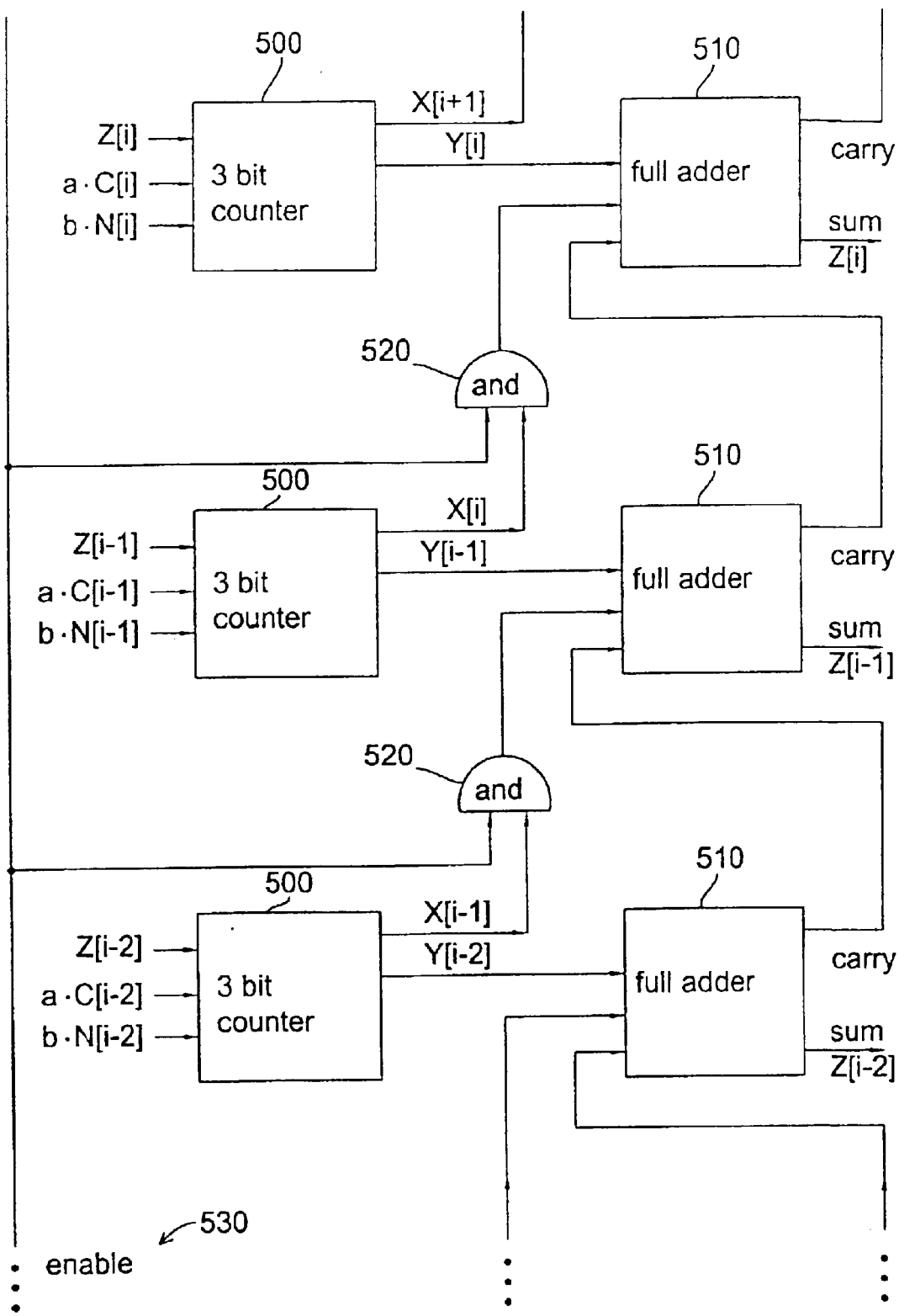
FIG. 5 is a part of a three-operands adding unit for the GF($2^n$) arithmetic or the Z/NZ arithmetic.

As has already been explained, an essential advantage of the inventive concept for calculating the modular multiplication over $GF(2^n)$ is based on the fact that it can be integrated into the already existing long number calculating unit for the ZDN method. FIG. 5 shows a part of an inventively adapted three-operands calculating unit for performing the three-operands addition with Z, aC and bN.

In FIG. 5, three bit slices [i], [i-1], [i-2] connected to one another are illustrated. Each bit slice includes a three-bit counter 500 and a full adder 510 to obtain, on the output side, a bit Z[i], Z[i-1] and Z[i-2], respectively of the updated intermediate result polynomial. The full adder further has a carry output for the carry input of the next higher full adder. If, for example, polynomials with the degree of 200 are processed, 200 bit slice adders of FIG. 5 must be connected in parallel.

To modify a bit slice of FIG. 5 for $GF(2^n)$, as is shown in FIG. 5, an AND gate 520 must be inserted between the upper output of the three-bit counter and the second lowest input of the full adder of the next higher stage. If a 0 is fed into the enable input 530, the value x will always be 0. The function of the full adder 510 then always degenerates to an addition of y and 0. In the case of Z/NZ, the enable input of the AND gate, however, is provided with a "1" so that the AND gate has no further effect.

In $GF(2^n)$ the output of the AND gate is thus 0. In Z/NZ however, X is required, wherein the output of the AND gate can be unequal to 0. The enabling is thus realised by an AND gate. The addition in the full adder, however, becomes trivial for the case of $GF(2^n)$, that is a 0 at the enable input 530.

Figure 6:
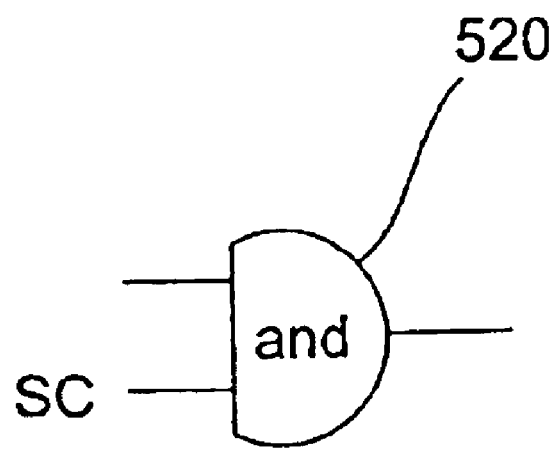
FIG. 6 is a detailed illustration of the carry disabling function.

FIG. 6 shows the situation at the AND gate 520. The calculating unit, which is partially illustrated in FIG. 5, will have the effect of a normal adder if the enable signal SC=1. It will, however, have the effect of an XOR circuit if the enable signal is SC=0.

Figure 7:
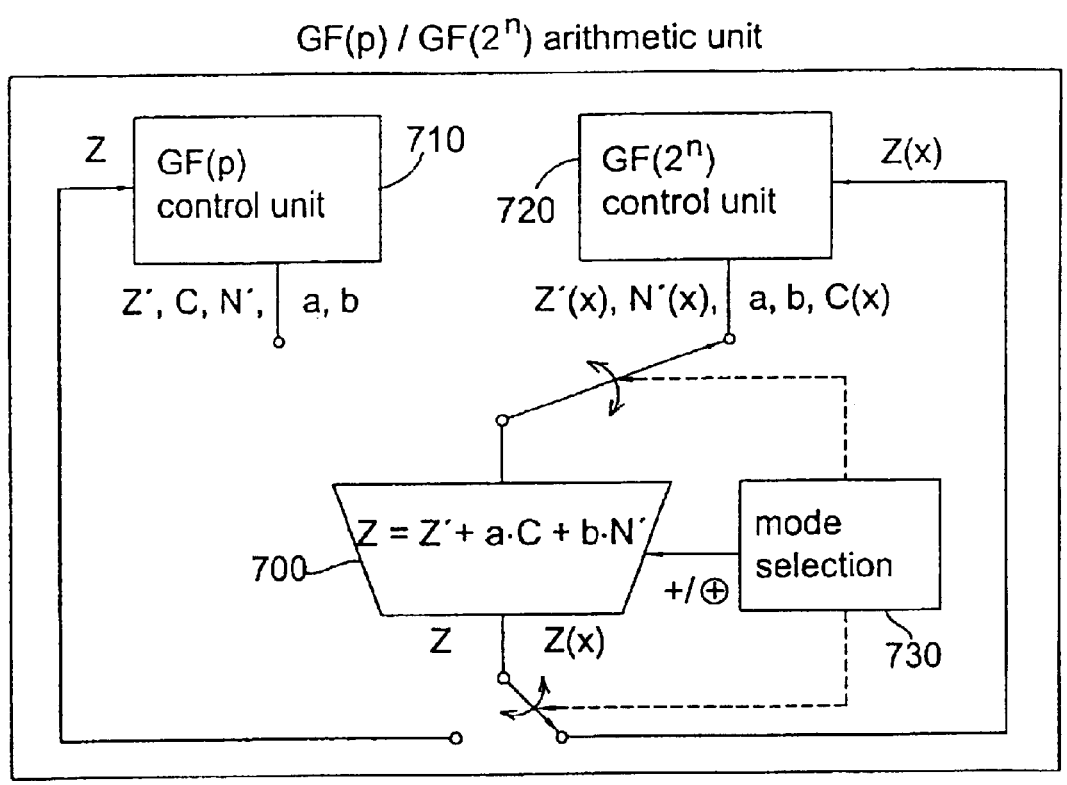
FIG. 7 is a block diagram of a Z/NZ/GF($2^n$) calculating unit.

FIG. 7 shows a schematic block diagram of a calculating unit for Z/NZ and $GF(2^n)$. The calculating unit is grouped around the long number arithmetic unit 700 which performs the three-operands operation already described either for Z/NZ or $GF(2^n)$.

The calculating unit further includes a Z/NZ control unit 710 as well as a $GF(2^n)$ control unit 720 and a mode selection apparatus 730. If the calculating unit is to calculate operations modulo an integer, the mode selection 730 will control the arithmetic unit 700 in such a way that a true addition operation is performed, the arithmetic unit being connected to the Z/NZ control unit 710 on the input side and the output side. If, however, the calculating unit is to operate a $GF(2^n)$ arithmetic, the mode selection 730 will activate the arithmetic unit 700 in such a way that instead of an addition, an XOR operation is performed and that the input and the output of the arithmetic unit are connected to the $GF(2^n)$ control unit.

Thus, separate arithmetic units are no longer required to house both an integer modulo arithmetic as well as a polynomial modulo arithmetic in one calculating unit.

It is pointed out that due to the fact that the three-operands operation is performed for all bits in parallel most of the chip space is consumed by for the arithmetic unit 700, while the further smaller calculations which are to be carried out in the control unit 710 and 720 can be managed with far shorter numbers so that, as far as the bit area is concerned, this hardly makes a difference.

In contrast to a calculating unit which required an individual calculating unit for both the integer arithmetic as well as the polynomial arithmetic, the inventive concept for calculating the modular multiplication thus allows a reduction of the chip area by almost 50%. Especially for Smart Cards this significant saving in chip area leads to considerable competitive advantages.

Figure 10:
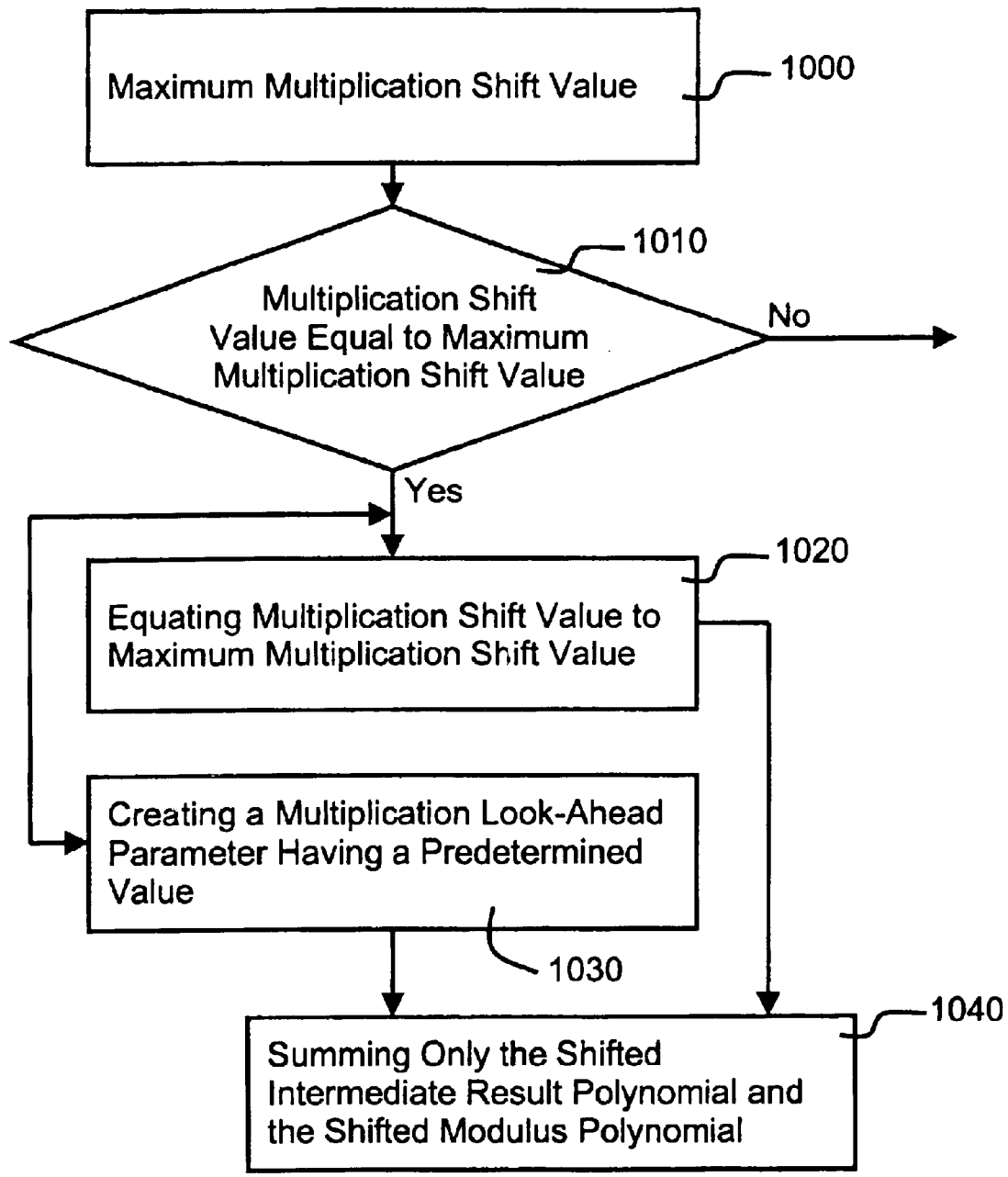
FIG. 10 is a block diagram showing the inventive method, when the multiplication shift value is equal to a maximum multiplication shift value.

FIG. 10 shows an embodiment of the present invention, when the multiplication shift value $s_z$ is equal to a maximum multiplication shift value as indicated in box 1010. It is determined, whether the multiplication shift value as determined by multiplication look-ahead method is equal to a maximum multiplication shift value. When the question in box 1010 is answered by "yes", the multiplication shift value is set equal to the maximum multiplication shift value as indicated in box 1020. Additionally, a multiplication look-ahead parameter is created, which has a predetermined value as indicated in box 1030 in the FIG. 3 embodiment, when the look-ahead-parameter is the parameter a, and the predetermined value of a is zero in the three-operands addition shown in box 218 of FIG. 2. This results in the fact that the term a multiplied by C is zero, since a is zero. This results in the fact that only the shifted intermediate result polynomial Z' and the shifted modulus polynomial N' are summed together as indicated in box 1040 in FIG. 10.

What is claimed is:

1. Method for modular multiplying a multiplicand by a multiplier using a modulus, said multiplicand, said multiplier and said modulus being polynomials of a variable in a polynomial modulo arithmetic, within a cryptographic calculation, said multiplicand, said multiplier and said modulus being parameters in said cryptographic calculation, said method comprising the following steps:

(a) performing a multiplication look-ahead method to obtain a multiplication shift value, said multiplication shift value being incremented at a power of said multiplier, which is not present in the multiplier polynomial;

(b) multiplying said variable raised to the power of said multiplication shift value by an intermediate result polynomial to obtain a shifted intermediate result polynomial;

(c) performing a reduction look-ahead method to obtain a reduction shift value, said reduction shift value being equal to the difference of the degree of said shifted intermediate result polynomial and the degree of said modulus polynomial;

(d) multiplying said variable raised to the power of said reduction shift value by said modulus polynomial to obtain a shifted modulus polynomial;

(e) summing said shifted intermediate result polynomial and said multiplicand and subtracting said shifted modulus polynomial to obtain an updated intermediate result polynomial; and (f) repeating steps (a) to (e) until all the powers of said multiplier have been processed, wherein in the repetition of steps (a) to (e)

in step (d) said updated intermediate result polynomial of the previous step (e) is used as said intermediate result polynomial, and in step (c) said shifted polynomial of the previous step (d) is used as a modulus polynomial.

2. Method according to claim 1, wherein said multiplying in step (d) is carried out by shifting said intermediate result polynomial by a number of digits equalling said multiplication shift value, and wherein said multiplying in step (d) is carried out by shifting said modulus polynomial by a number of digits equalling said reduction shift value.

3. Method according to claim 1, wherein coefficients of said polynomials can only take the values "0" or "1", and wherein said summing and subtracting in step (e) is carried out by bitwise XORing said intermediate result polynomial, said multiplicand and said shifted modulus polynomial.

4. Method according to claim 1, wherein said step of said reduction look-ahead method to obtain a reduction shift value comprises the following steps:

determining an auxiliary shift value so that the degree of said modulus polynomial and the degree of said updated intermediate result polynomial of the previous step (e) multiplied by a variable which is raised to the power of said auxiliary shift value are equal, and forming the difference of said multiplication shift value and said auxiliary shift value to obtain said reduction shift value.

5. Method according to claim 4, wherein said step of performing said multiplication look-ahead method and said step of determining said auxiliary shift value are carried out parallel to each other.

6. Method according to claim 1, wherein said multiplication shift value is limited to a maximum multiplication shift value, wherein said step of performing said multiplication look-ahead method comprises the following steps:

if said multiplication shift value equals said maximum multiplication shift value, equating said multiplication shift value with said maximum shift value, creating a multiplication look-ahead parameter with a predetermined value, and wherein said step of summing comprises the following steps:

if said multiplication look-ahead parameter has said predetermined value, summing only said shifted intermediate result polynomial and said shifted modulus polynomial.

7. Apparatus for modular multiplying a multiplicand by a multiplier using a modulus, said multiplicand, said multiplier and said modulus being polynomials of a variable in a polynomial modulo arithmetic, within a cryptographic calculation, said multiplicand, said multiplier and said modulus being parameters in said cryptographic calculation, said apparatus comprising:

(a) means for performing a multiplication look-ahead method to obtain a multiplication shift value, said multiplication shift value being incremented at a power of said multiplier, which is not present in the multiplier polynomial;

(b) means for multiplying said variable which is raised to the power of said multiplication shift value by an intermediate result polynomial to obtain a shifted intermediate result polynomial;

(c) means for performing a reduction look-ahead method to obtain a reduction shift value, said reduction shift value being equal to the difference of the degree of said shifted intermediate result polynomial and the degree of said modulus polynomial;

(d) means for multiplying said variable which is raised to the power of said reduction shift value by said modulus polynomial to obtain a shifted modulus polynomial;

(e) means for summing said shifted intermediate result polynomial and said multiplicand and subtracting said shifted modulus polynomial to obtain an updated intermediate result polynomial; and (f) means for repeatedly controlling said means (a) to (e) until all the powers of said multiplier have been processed, wherein in a repeated control of said means (a) to (e)

said means for multiplying to obtain a shifted intermediate result polynomial is arranged to use said updated intermediate result polynomial of the previous control of said means for summing as an intermediate result polynomial, and said means for performing a reduction look-ahead method is arranged to use, in a repeated control, as the modulus polynomial, said shifted modulus polynomial of the previous control of said means for multiplying to obtain a shifted modulus polynomial.

8. Apparatus according to claim 7, wherein said means for multiplying to obtain a shifted intermediate result polynomial and said means for multiplying to obtain a shifted modulus polynomial are implemented as controllable shift registers to perform, depending on said multiplication shift value or on said reduction shift value, a shift of the register contents by a corresponding number of digits.

9. Apparatus according to claim 7, wherein said means for summing and for subtracting includes a bitwise XORing device for XORing said intermediate result polynomial, said multiplicand polynomial and said shifted modulus polynomial.

10. Apparatus according to claim 7, in which said means for summing and subtracting comprises:

a counter with three input lines and two output lines, wherein a bit of said intermediate result polynomial can be applied to a first input line, wherein a bit of said multiplicand can be applied to a second input line, and wherein a bit of said shifted modulus polynomial can be applied to a third input line;

a full adder with three inputs and one output, a low-order output of said counter being connected to a higher order input line of said full adder;

a switch connected between a higher order output line of said counter and a middle input of a full adder for a higher order bit; and a control unit for opening said switch when polynomials are to be processed.

11. Apparatus according to claim 7, formed as a calculating unit for multiplying the multiplicand by the multiplier using the modulus, the calculating unit further being formed for multiplying a multiplicand integer by a multiplier integer using a modulus integer, wherein the means for summing is formed as a three-operands adder comprising a carry disabling means, the means for summing being arranged for combining either integer operands or polynomial operants, wherein the apparatus further comprises a control means for controlling said carry disabling means so that a carry is deactivated when the polynomial operands are processed by the means for summing and so that the carry is activated when the integer operands are processed by the means for summing.

12. Apparatus according to claim 11, in which said three-operands adder having the carry disabling means comprises:

a counter with three input lines and two output lines, wherein a bit of an intermediate result polynomial is applicable to a first input line, wherein a bit of said multiplicand is applicable to a second input line, and wherein a bit of said shifted modulus polynomial is applicable to a third input line;

a full adder with three inputs and one output, a low-order output of said counter being connected to a higher order input line of said full adder;

a switch being connected between a higher order output line of said counter and a middle input of a full adder for a next higher bit; and a control unit for opening said switch when polynomials are to be processed.

13. Apparatus according to claim 12, wherein a plurality of three-operands adders are present, the number of three-operands adders present being greater than or equal to the number of digits of the modulus integer or the modulus polynomial.

* * * * *